April 10, 1962 W. L. HUGHES 3,028,795
CUTTING AND SEALING APPARATUS
Filed Oct. 6, 1959 2 Sheets-Sheet 1

INVENTOR
WILLIAM L. HUGHES
BY John Gibson Semmes
ATTORNEY

April 10, 1962 W. L. HUGHES 3,028,795
CUTTING AND SEALING APPARATUS
Filed Oct. 6, 1959 2 Sheets-Sheet 2

INVENTOR
WILLIAM L. HUGHES
BY *John Gibson Semmes*
ATTORNEY

United States Patent Office 3,028,795
Patented Apr. 10, 1962

3,028,795
CUTTING AND SEALING APPARATUS
William L. Hughes, 742 E. 25th St., Norfolk, Va.
Filed Oct. 6, 1959, Ser. No. 844,782
6 Claims. (Cl. 93—1)

The present invention relates to an apparatus for the cutting of material and the sealing of the cut so made, particularly an apparatus which is utilizable with conventional pressure-sensitive tapes for cutting an aperture in material and sealing with tape the aperture so as to provide an adhesive means for fastening said material to a supporting surface.

The instant apparatus is utilizable, for example, in the application of pressure-sensitive tapes to the corners of an advertising sign or the like, as for fastening the sign to a store-window or wall, as described in U.S. Patent No. 1,807,442. It is intended that the instant apparatus be utilized manually in the home or office, however, power driving means may be employed effectively. Although the use of pressure-sensitive tapes in the fastening of signs, papers and the like to a surface is widespread, the art does not teach the use of a device for conveniently applying said tape to an article to be supported or an apparatus which will both cut an aperture in the material to be supported and seal the aperture with tape which is thus presented for fastening utilization.

The instant device comprises a conventional base and lever arm pivoted thereto. Mounted within the base is a female die and mounted within the pivoted lever arm is a roll source of pressure-sensitive tape, means for advancing same and a male die. Upon pivoting of the lever arm towards the base, an aperture is cut in the material to be fastened by engagement of the dies and sequentially the tape is sealed about the aperture. Upon withdrawal from the device the sign or like material is available instantly for fastening to a wall or like supporting surface by simple pressurizing of the tape through the aperture and onto the supporting surface, as taught in applicant's co-pending applications Serial Nos. 811,310 for Exhibiting Device and 815,120 for File Folder Construction.

Accordingly, it is an object of invention to provide a cutting and sealing apparatus which will conveniently provide various materials with fastening means.

Another object of invention is to provide an apparatus for cutting materials and sealing upon the cut so made a pressure-sensitive tape which is available for fastening support of said material.

Another object of invention is to provide an apparatus wherein a tape source is advanced through a cutting and sealing area defined by pivoted dies and is applicable to die cuts made upon a material in said area.

Yet additional objects of invention will become apparent from the attached drawings wherein.

Figure 3:
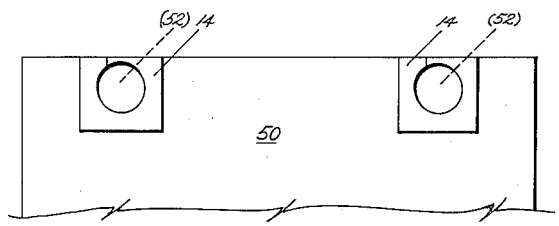

FIG. 3 is a partially fragmentary top plan of a piece of material 50 cut and sealed by the instant apparatus, so that pressure sensitive tape 14 is extensible through cuts 52 for fastening support of material 50.

Figure 4:
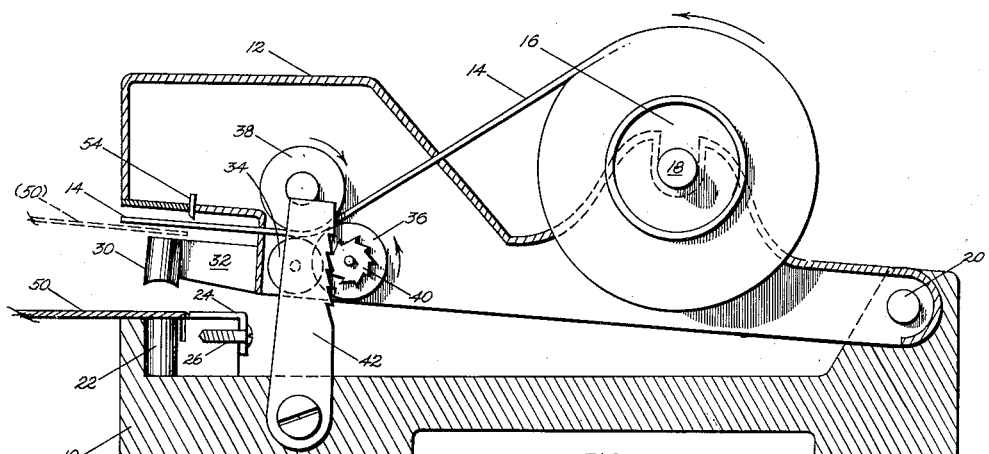

FIG. 4 is a side elevation, partially in section, showing the tape roll source advanceable by means of drive rollers through a cutting and sealing area defined by the female and male dies and applicable to a material 50 which is about to be cut.

Figures 5, 6:
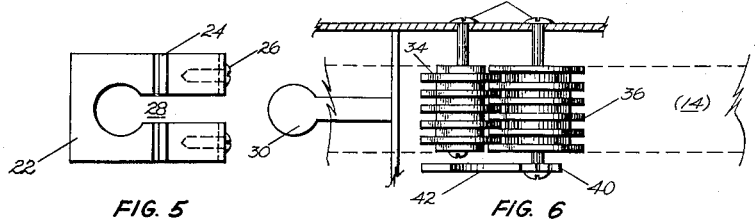

FIG. 5 is a top plan of female die 22 and material stop 24 attached thereto.

FIG. 6 is a fragmentary top plan partially in section, showing male die 30 attached to the lever arm and adjacently thereof ribbed drive rollers 34 and 36 engageable with pressure-sensitive tape 14 and base fastened ratchet 42.

Figures 1, 2:
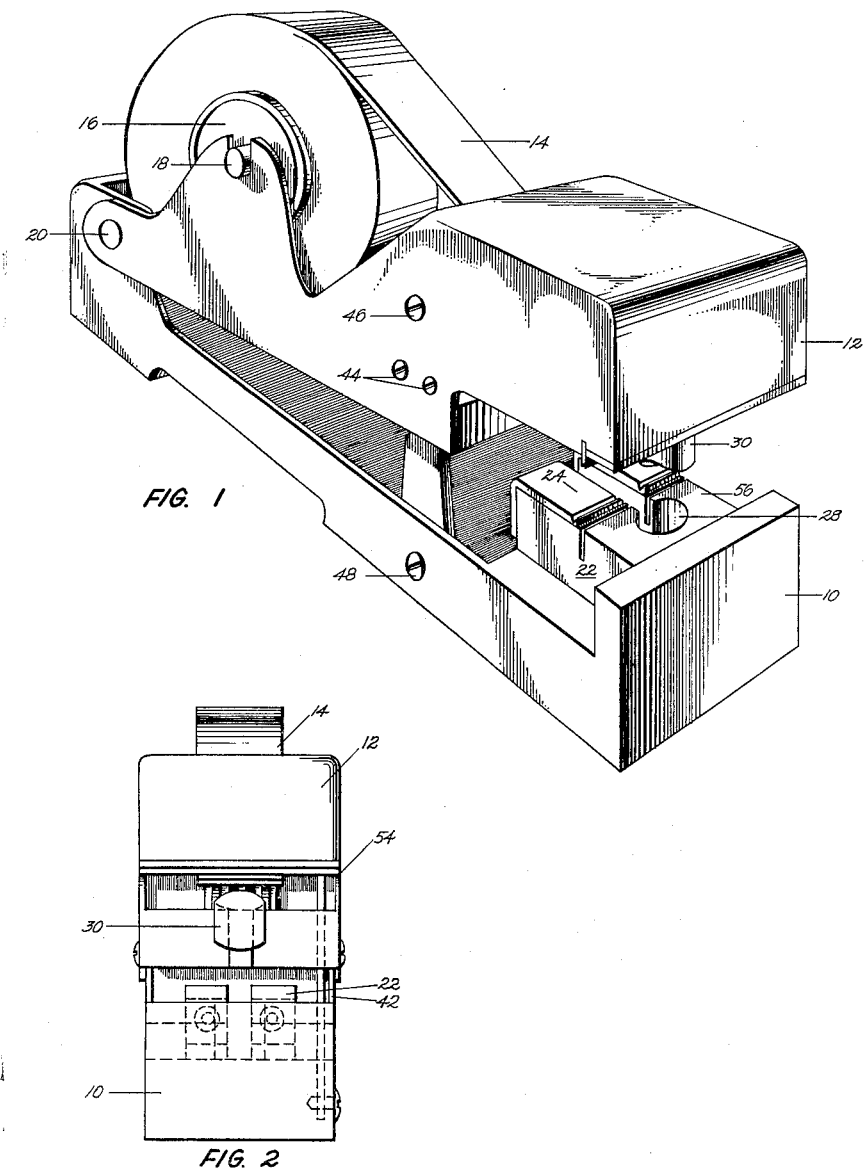
FIG. 1 is a perspective view of the instant apparatus, showing the lever arm carrying a tape roll source and pivoted to a base member.
FIG. 2 is a front elevation of the apparatus, showing the circular male die attached at the front of the lever arm and positioned for pivoting engagement with the female die (partially shown in phantom) mounted in the base.

In FIG. 1 base 10 is illustrated as having mounted in its front portion female die 22 having cutting aperture 28 and defining area 56 for the cutting and sealing of material. Fixed to female die 22 is material stop 24 which may be fastened by means of screws 26 or the like. Spring loaded lever arm 12 is pivoted to base frame 10 as at 20 and has fixed in its front male die 30 mounted at the end of arm 32 (see FIGS. 4 and 6).

Turning now to FIG. 4, tape 14 is illustrated as rolled about conventional hub 16 which may be secured removably in lever arm 12 by means of journal 18. Tape 14 is advanceable through the lever arm 12 and above cutting and sealing area 56 by means of ribbed drive rollers 34 and 36 and rubberized pressure roller 38 which urges tape 14 against the said drive rollers. Drive rollers 34 and 36 may be supported by means of screw journals 44 or the like and roller 38 may be supported by means of screw journal 46. Roller 36 has attached at one end spur gear 40 which is engageable with ratchet 42 pivoted in base 10.

Material to be cut, and sealed as illustrated in FIG. 3 is advanced into cutting and sealing area 56. Upon downward pivoting of lever arm 12, male die 30 engages female die aperture 28 and thus cuts through material 50. Simultaneously, a leading portion of tape 14 is cut transversely by engagement of tape knife 54 with stop 24 and this portion of tape is advanced onto material 50 and sealed about the cut so made. Upon manual release lever arm 12 springs upward and male die 30 thus lifts the cut and sealed material 50 upwardly from female die 22. Material 50 may then be easily disengaged from the apparatus and utilized, as shown in FIG. 3, for fastening to a supporting surface.

As will be apparent, various types of material such as paper, cellophane, canvas, polyethylene, polyvinylchloride and various types of tapes may be employed, according to this invention. Variously configured dies may be employed so that slot-like, triangular, polygonal, rectangular and other types of cuts are made in the material to be fastened. The size of the cut and the quantities of tape applied to the material will, of course, be dependent upon the weight of the material and the manner in which it is to be fastened to a supporting surface. Also, the instant apparatus is utilizable to apply other than pressure-sensitive tape upon a cut surface.

Manifestly, various changes in the illustrated apparatus and modifications thereof might be employed without departing from the spirit of invention and the scope of the appended claims.

I claim:

1. In an apparatus for cutting material of the type embodying a cutting arm pivotable with respect to a stationary base upon which the material is supported, the combination in said cutting arm of a pressure sensitive tape source, a tape cutter, means for cutting an aperture in said material positioned intermediate said tape cutter, and said base and sealing means positioned adjacent said tape cutter and intermediate said arm and said means for cutting an aperture in said material, so as to seal a cut portion of pressure-sensitive tape over the aperture cut in said material, a medial pressure-sensitive portion of said tape being extensible through said aperture as a means for fastening said material to a supporting surface.

2. A cutting and sealing apparatus comprising a base, a first die supported in said base and defining an area for the cutting of material, a tape sealing arm pivoted to said base, a second die supported in said arm opposite said first die, a tape sealer and a tape cutter positioned in said arm apart from said second die and a source of tape mounted in said arm and extending between said tape sealer and cutter and said second die, said dies being engageable with each other to cut an aperture in material supported over said first die upon pivoting of said arm toward said base and said tape sealer engaging a leading portion of said tape and pressing same completely over said aperture in said material and said cutter severing said leading portion of tape adjacent said second die.

3. A cutting and sealing apparatus comprising a base and a lever arm pivoted to said base, a female die supported in said base and defining an area for the cutting and sealing of material, a male die mounted upon said arm and engagable with said female die upon pivoting of said arm so as to cut materials supported in said female die, a tape cutter positioned in said lever arm apart from said male die, and a pressure sensitive tape source journalled in said arm and advanceable between said tape cutter and said male die and over said cutting and sealing area and sealable by said arm completely over die cuts made in said material.

4. A cutting and sealing apparatus as in claim 3, including a drive roller journalled adjacent said tape in said arm and engageable with ratchet means supported by said base, said drive roller advancing said tape during pivoting of said arm.

5. A cutting and sealing apparatus comprising a base and a lever arm pivoted in said base, a female die supported in said base and defining an area for the cutting and sealing of material, a male die mounted upon said arm and upon pivoting of said arm cuttingly engageable with said female die and a material supported thereon, a tape sealer and a tape cutter positioned in said arm apart from said male die, a pressure-sensitive tape source journalled in said arm and advanceable over said male die and said cutting and sealing area and upon pivoting of said arm sealable by said arm completely over die cuts made in said material, driving rollers journalled in said lever arm and engageable with ratchet means supported by said base and a pressurizing roller journalled in said lever arm and urging said tape against said drive rollers.

6. A cutting and sealing apparatus comprising a base and a lever arm pivoted at one end of said base, a female die supported at the open end of said base and defining an area for the cutting and sealing of material, a material stop guard mounted upon said female die, a male die supported in the open end of said lever arm and upon pivoting of said arm toward said base engageable with said female die for cutting material supported thereon, a tape sealer positioned in said arm apart from said male die, a roll source of pressure-sensitive tape removably journalled in said lever arm and extensible through said cutting and sealing area and between said tape sealer and said male die, knife means mounted in said lever arm apart from said male die and engageable with said material stop for transversely severing said tape sequentially of die cutting of said material upon pivoting of said lever arm, ribbed drive rollers journalled adjacent said tape in said lever arm and engageable with ratchet means supported by said base, said drive rollers advancing said tape during pivoting of said arm and a pressure roller journalled in said arm and urging said tape against said drive roller.

References Cited in the file of this patent
UNITED STATES PATENTS

| | | |
|---|---|---|
| 2,313,311 | Arter et al. | Mar. 9, 1943 |
| 2,441,821 | Kendall | May 18, 1948 |
| 2,561,387 | Forese | July 24, 1951 |
| 2,643,786 | Baker | June 30, 1953 |
| 2,949,370 | Hughes | Aug. 16, 1960 |

FOREIGN PATENTS

| | | |
|---|---|---|
| 16,978 | Great Britain | July 27, 1906 |